United States Patent
Hu et al.

(10) Patent No.: US 11,521,314 B2
(45) Date of Patent: Dec. 6, 2022

(54) SYSTEMS AND METHODS FOR IMAGE PROCESSING

(71) Applicant: SHANGHAI UNITED IMAGING HEALTHCARE CO., LTD., Shanghai (CN)

(72) Inventors: Lingzhi Hu, Houston, TX (US); Masoud Edalati, Houston, TX (US)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 133 days.

(21) Appl. No.: 16/731,090

(22) Filed: Dec. 31, 2019

(65) Prior Publication Data

US 2021/0201477 A1 Jul. 1, 2021

(51) Int. Cl.
*G06T 7/00* (2017.01)
*G06T 7/136* (2017.01)
*G06T 7/11* (2017.01)

(52) U.S. Cl.
CPC .............. *G06T 7/0012* (2013.01); *G06T 7/11* (2017.01); *G06T 7/136* (2017.01); *G06T 2207/10024* (2013.01); *G06T 2207/10081* (2013.01); *G06T 2207/10088* (2013.01); *G06T 2207/30048* (2013.01)

(58) Field of Classification Search
CPC ......... G06T 7/0012; G06T 7/136; G06T 7/11; G06T 2207/10024; G06T 2207/30048
See application file for complete search history.

(56) References Cited

U.S. PATENT DOCUMENTS

| | | | |
|---|---|---|---|
| 7,907,759 B2 | 3/2011 | Hundley et al. | |
| 9,886,782 B2 | 2/2018 | Jo et al. | |
| 2017/0164908 A1* | 6/2017 | Kimura | G06T 15/08 |
| 2018/0240234 A1 | 8/2018 | Marrouche et al. | |
| 2019/0164291 A1* | 5/2019 | Wang | G06T 1/60 |
| 2020/0111559 A1* | 4/2020 | Honjo | G06V 10/25 |
| 2020/0245960 A1* | 8/2020 | Richter | A61B 6/032 |

OTHER PUBLICATIONS

Wang K et al., Atherosclerotic Neovasculature MR Imaging with Mixed Manganese-gadolinium Nanocolloids in Hyperlipidemic Rabbits, Nanomedicine, 11(3):569-578, 2015.
(Continued)

*Primary Examiner* — Vu Le
*Assistant Examiner* — Winta Gebreslassie
(74) *Attorney, Agent, or Firm* — Metis IP LLC

(57) ABSTRACT

A method may include obtaining an image representing a region of interest (ROI) of an object. The ROI may include two or more sub-regions. The method may include determining an average value of quantitative indexes associated with elements in the image corresponding to a first region of the ROI. The method may include determining, for each of the two or more sub-regions of the ROI, a threshold based on the average value; identifying target elements in the image based on the thresholds of the two or more sub-regions. The method may include assigning a presentation value to each of at least some of the target elements based on the average value and the quantitative index of the each target element. The method may include generating a presentation of the image based on the presentation values.

20 Claims, 7 Drawing Sheets

(56) References Cited

OTHER PUBLICATIONS

Schmieder AH et al., Molecular MR Imaging of Neovascular Progression in the Vx2 Tumor with αvβ3-targeted Paramagnetic Nanoparticles, Radiology, 268(2):470-480, 2013.

Jakob Nikolas Kather et al., Color-coded Visualization of Magnetic Resonance Imaging Multiparametric Maps, Scientific Reports, 2017, 11 pages.

* cited by examiner

600

| 610 | Obtaining a plurality of two-dimensional (2D) images representing a volume of interest (VOI) of an object, the VOI including two or more sub-regions, the plurality of 2D images being generated based on imaging signals corresponding to the VOI |

↓

| 620 | Determining an average signal intensity of signal intensities of the imaging signals associated with pixels corresponding to a first region of the VOI |

↓

| 630 | For each of the two or more sub-regions of the VOI, determining a threshold based on the average signal intensity, the thresholds of at least two of the two or more sub-regions being different |

↓

| 640 | Identifying target pixels in the plurality of 2D images based on the thresholds of the two or more sub-regions, the signal intensity of the imaging signal of each of the target pixels being equal to or larger than the threshold of the corresponding sub-region |

↓

| 650 | Assigning a presentation value to each of at least some of the target pixels based on the average signal intensity and the signal intensity of the imaging signal of the each target pixel |

↓

| 660 | Generating a presentation of the plurality of 2D images based on the presentation values |

FIG. 6

SYSTEMS AND METHODS FOR IMAGE PROCESSING

TECHNICAL FIELD

The present disclosure generally relates to medical image processing, and in particular, to systems and methods for color visualization of medical images.

BACKGROUND

Magnetic resonance imaging (MRI) is a non-invasive technology of acquiring an image showing the internal structure of a patient. Magnetic resonance (MR) images, e.g., T1, T2, and diffusion weighted images, are not sufficiently meaningful and poorly understood by most users (e.g., doctors). From a user's point of view, what matters is the amount of normal versus abnormal tissues and where they are located. Therefore, it is desirable to provide systems and/or methods to present the amount of the abnormal tissue and/or how the abnormal tissue spatially spreads to users.

SUMMARY

According to a first aspect of the present disclosure, a system for image processing may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain an image representing a region of interest (ROI) of an object. The ROI may include two or more sub-regions. The image may be generated based on imaging signals corresponding to the ROI. The one or more processors may determine an average value of quantitative indexes associated with elements in the image corresponding to a first region of the ROI. The one or more processors may determine, for each of the two or more sub-regions of the ROI, a threshold based on the average value. The thresholds of at least two of the two or more sub-regions may be different. The one or more processors may identify target elements in the image based on the thresholds of the two or more sub-regions. The quantitative index of each of the target elements may be equal to or larger than the threshold of the corresponding sub-region. The one or more processors may assign a presentation value to each of at least some of the target elements based on the average value and the quantitative index of the each target element. The one or more processors may generate a presentation of the image based on the presentation values.

In some embodiments, the ROI may include a volume of interest (VOI).

In some embodiments, the image may include a plurality of two-dimensional (2D) image slices.

In some embodiments, each of the plurality of 2D image slices may include a target area corresponding to the ROI. The one or more processors may determine a second region in at least one of the plurality of 2D image slices. The second region may include at least a portion of the target elements. The one or more processors may determine a first ratio between an area of the second region and an area of the target area of the at least one of the plurality of 2D image slices. The one or more processors may determine a third region including all the target elements. The one or more processors may determine a second ratio between a volume of the third region and a volume of the ROI. The one or more processors may determine a third ratio between the volume of the third region and a volume of an American Heart Association (AHA) segmental model.

In some embodiments, the presentation may include an illustration of at least one of the second region, the target area, the third region, the ROI, the first ratio, the second ratio, the third ratio, and the AHA segmental model.

In some embodiments, the presentation may include at least one of the plurality of 2D image slices that includes an illustration of presentation values of the target elements within the at least one 2D image slice.

In some embodiments, the one or more processors may determine a standard deviation of the quantitative indexes associated with the elements in the image corresponding to the first region of the VOI. The threshold of each of the two or more sub-regions of the ROI may be determined based further on the standard deviation.

In some embodiments, the presentation value of one of at least some of the target elements may be a color value.

In some embodiments, the first region of the ROI may include normal tissue within the ROI.

In some embodiments, the threshold for each of the two or more sub-regions of the ROI may relate to a physiological condition of the ROI.

In some embodiments, to identify the target elements in the image, the one or more processors may determine candidate elements in the image. The quantitative index corresponding to each of the candidate elements may be equal to or larger than the threshold of the corresponding sub-region. The one or more processors may divide the candidate elements into one or more groups based on the locations of the candidate elements in the image. The one or more processors may determine a count of candidate elements in each of the one or more groups. For each of the one or more groups, the one or more processors may determine whether the count of candidate elements in the group exceeds a count threshold. In response to determining that the count of candidate elements in the group exceeds the count threshold, the one or more processors may determine the candidate elements in the group as the target elements.

In some embodiments, to assign the presentation value to each of at least some of the target elements based on the average value and the quantitative index of the each target element, the one or more processors may determine a difference between the average value and the quantitative index corresponding to the each target element. The one or more processors may determine the presentation value of the each target element based on the difference. Target elements whose differences are within a same range may be assigned a same presentation value.

In some embodiments, the presentation includes a three-dimensional (3D) model may correspond to at least a portion of the ROI.

In some embodiments, the 3D model may include an illustration of presentation values of at least a portion of the at least some target elements.

In some embodiments, the image may include one or more computed tomography (CT) images or magnetic resonance (MR) images.

In some embodiments, the ROI may include at least a part of a heart of the object.

In some embodiments, the quantitative index associated with the element may include signal intensity of the imaging signal associated with the element.

According to another aspect of the present disclosure, a method for image processing may include one or more of the following operations. One or more processors may obtain an image representing a region of interest (ROI) of an object. The ROI may include two or more sub-regions. The image may be generated based on imaging signals corresponding to the ROI. The one or more processors may determine an average value of quantitative indexes associated with elements in the image corresponding to a first region of the ROI. The one or more processors may determine, for each of the two or more sub-regions of the ROI, a threshold based on the average value. The thresholds of at least two of the two or more sub-regions may be different. The one or more processors may identify target elements in the image based on the thresholds of the two or more sub-regions. The quantitative index of each of the target elements may be equal to or larger than the threshold of the corresponding sub-region. The one or more processors may assign a presentation value to each of at least some of the target elements based on the average value and the quantitative index of the each target element. The one or more processors may generate a presentation of the image based on the presentation values.

According to yet another aspect of the present disclosure, a system for image processing may include an image obtaining module configured to obtain an image representing a region of interest (ROI) of an object. The ROI including two or more sub-regions. The image being generated based on imaging signals corresponding to the ROI. The system may also include a threshold determination module configured to determine an average value of quantitative indexes associated with elements in the image corresponding to a first region of the ROI. The threshold determination module may be further configured to determine, for each of the two or more sub-regions of the ROI, a threshold based on the average value. The thresholds of at least two of the two or more sub-regions may be different. The system may also include a pixel identification module configured to identify target elements in the image based on the thresholds of the two or more sub-regions. The quantitative index of each of the target elements may be equal to or larger than the threshold of the corresponding sub-region. The system may also include a value assigning module configured to assign a presentation value to each of at least some of the target elements based on the average value and the quantitative index of the each target element. The system may also include a presentation module configured to generate a presentation of the image based on the presentation values.

According to yet another aspect of the present disclosure, a non-transitory computer readable medium may comprise at least one set of instructions for image processing. The at least one set of instructions may be executed by one or more processors of a computer server. The one or more processors may obtain an image representing a region of interest (ROI) of an object. The ROI may include two or more sub-regions. The image may be generated based on imaging signals corresponding to the ROI. The one or more processors may determine an average value of quantitative indexes associated with elements in the image corresponding to a first region of the ROI. The one or more processors may determine, for each of the two or more sub-regions of the ROI, a threshold based on the average value. The thresholds of at least two of the two or more sub-regions may be different. The one or more processors may identify target elements in the image based on the thresholds of the two or more sub-regions. The quantitative index of each of the target elements may be equal to or larger than the threshold of the corresponding sub-region. The one or more processors may assign a presentation value to each of at least some of the target elements based on the average value and the quantitative index of the each target element. The one or more processors may generate a presentation of the image based on the presentation values.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 is a flowchart illustrating an exemplary process for generating a presentation of a plurality of two-dimensional (2D) images according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Figure 3:
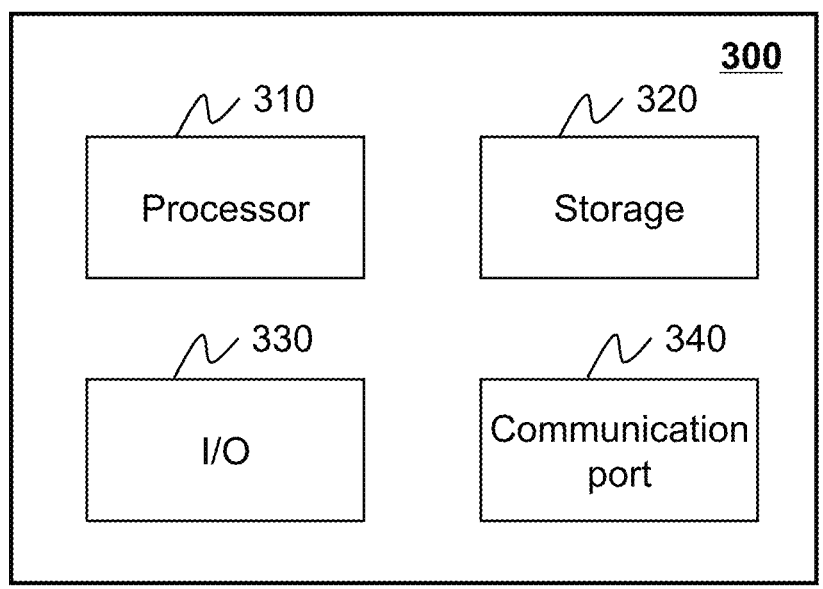
FIG. 3 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 310 as illustrated in FIG. 3) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for medical imaging and/or medical treatment. In some embodiments, the medical system may include an imaging system. The imaging system may include a single modality imaging system and/or a multi-modality imaging system. The single modality imaging system may include, for example, a magnetic resonance imaging (MRI) system. Exemplary MRI systems may include a superconducting magnetic resonance imaging system, a non-superconducting magnetic resonance imaging system, etc. The multi-modality imaging system may include, for example, a computed tomography-magnetic resonance imaging (MRI-CT) system, a positron emission tomography-magnetic resonance imaging (PET-MRI) system, a single photon emission computed tomography-magnetic resonance imaging (SPECT-MRI) system, a digital subtraction angiography-magnetic resonance imaging (DSA-MRI) system, etc. In some embodiments, the medical system may include a treatment system. The treatment system may include a treatment plan system (TPS), image-guide radiotherapy (IGRT), etc. The image-guide radiotherapy (IGRT) may include a treatment device and an imaging device. The treatment device may include a linear accelerator, a cyclotron, a synchrotron, etc., configured to perform a radio therapy on a subject. The treatment device may include an accelerator of species of particles including, for example, photons, electrons, protons, or heavy ions. The imaging device may include an MRI scanner, a CT scanner (e.g., cone beam computed tomography (CBCT) scanner), a digital radiology (DR) scanner, an electronic portal imaging device (EPID), etc.

For brevity, an image, or a portion thereof (e.g., a region of interest (ROI) in the image) corresponding to an object (e.g., a tissue, an organ, a tumor, etc., of a subject (e.g., a patient, etc.)) may be referred to as an image, or a portion of thereof (e.g., an ROI) of or including the object, or the object itself. For instance, an ROI corresponding to the image of a heart may be described as that the ROI includes a heart. As another example, an image of or including a heart may be referred to a heart image, or simply heart. For brevity, that a portion of an image corresponding to an object is processed (e.g., extracted, segmented, etc.) may be described as the object is processed. For instance, that a portion of an image corresponding to a heart is extracted from the rest of the image may be described as that the heart is extracted.

An aspect of the present disclosure relates to systems and methods for presenting abnormal tissue using a three-dimensional (3D) color-coded volume. The systems and/or methods may obtain a plurality of two-dimensional (2D) MR images representing a volume of interest (VOI) of an object. The VOI may include two or more sub-regions. The systems and/or methods may determine an average signal intensity and a standard deviation of MR signal intensities of pixels corresponding to some normal tissue of the VOI. The systems and/or methods may determine, for each of the two or more sub-regions of the VOI, a threshold based on the average signal intensity and the standard deviation. The thresholds of at least two of the two or more sub-regions may be different. The systems and/or methods may identify target pixels in the plurality of 2D images based on the thresholds of the two or more sub-regions. The MR signal intensity of each of the target pixels may be equal to or larger than the threshold of the corresponding sub-region. The systems and/or methods may assign a color value to each of at least some of the target pixels based on the average signal intensity and the MR signal intensity of the each target pixel. The systems and/or methods may display the plurality of 2D images with the color-coded target pixels displayed in colors corresponding to the color values. The systems and/or methods may display a 3D volume of at least a portion of the VOI in which voxels corresponding to the color-coded target pixels are displayed in the corresponding color. The systems and/or methods may provide information including the amount and/or the location of the normal tissue and/or the abnormal tissue in the VOI. In the systems and/or methods, the thresholds of at least two of the two or more sub-regions may be different, instead of a single threshold for the entire VOI, which may lead to a more accurate result for extracting the target pixels that represent abnormal tissue.

Figure 1:
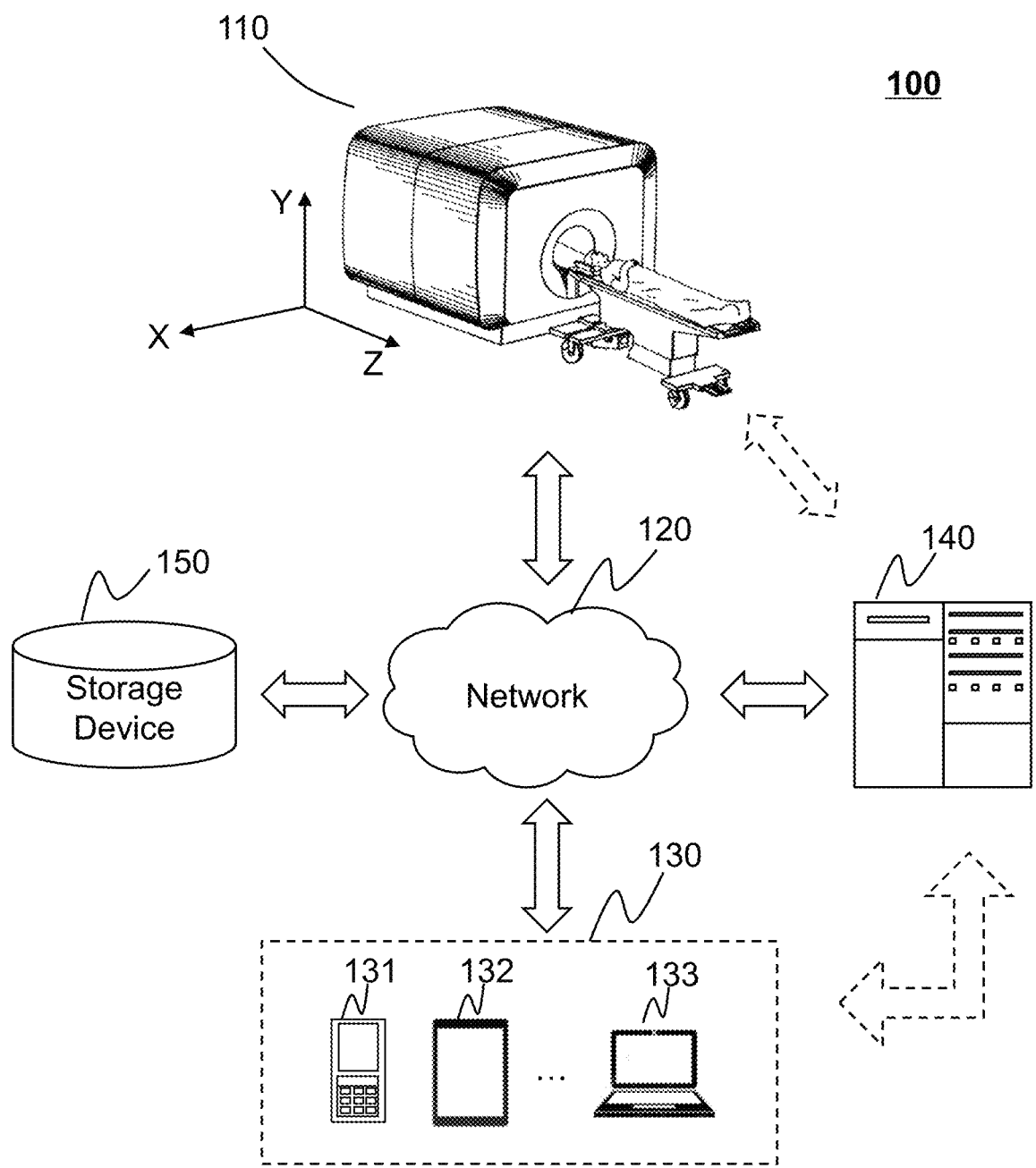
FIG. 1 is a schematic diagram illustrating an exemplary MRI system according to some embodiments of the present disclosure.

FIG. 1 is a schematic diagram illustrating an exemplary MRI system 100 according to some embodiments of the present disclosure. As illustrated, the MRI system 100 may include an MRI scanner 110, a network 120, a terminal 130, a processing device 140, and a storage device 150. The components of the MRI system 100 may be connected in one or more of various ways. Mere by way of example, as illustrated in FIG. 1, the MRI scanner 110 may be connected to the processing device 140 through the network 120. As another example, the MRI scanner 110 may be connected to the processing device 140 directly (as indicated by the bi-directional arrow in dotted lines linking the MRI scanner 110 and the processing device 140). As a further example, the storage device 150 may be connected to the processing device 140 directly or through the network 120. As still a further example, a terminal device (e.g., 131, 132, 133, etc.) may be connected to the processing device 140 directly (as indicated by the bi-directional arrow in dotted lines linking the terminal 130 and the processing device 140) or through the network 120.

The MRI scanner 110 may scan an object located within its detection region and generate a plurality of data relating to the object. In the present disclosure, "subject" and "object" are used interchangeably. Mere by way of example, the object may include a patient, a man-made object, etc. As another example, the object may include a specific portion, organ, and/or tissue of a patient. For example, the object may include head, brain, neck, body, shoulder, arm, thorax, cardiac, stomach, blood vessel, soft tissue, knee, feet, or the like, or any combination thereof. In some embodiments, the MRI scanner 110 may be a close-bore scanner or an open-bore scanner. In the present disclosure, the X axis, the Y axis, and the Z axis shown in FIG. 1 may form an orthogonal coordinate system. The X axis and the Z axis shown in FIG. 1 may be horizontal, and the Y axis may be vertical. As illustrated, the positive X direction along the X axis may be from the right side to the left side of the MRI scanner 110 seen from the direction facing the front of the MRI scanner 110; the positive Y direction along the Y axis shown in FIG. 1 may be from the lower part to the upper part of the MRI scanner 110; the positive Z direction along the Z axis shown in FIG. 1 may refer to a direction in which the object is moved out of the scanning channel (or referred to as the bore) of the MRI scanner 110. More description of the MRI scanner 110 may be found elsewhere in the present disclosure. See, e.g., FIG. 2 and the description thereof.

The network 120 may include any suitable network that can facilitate the exchange of information and/or data for the MRI system 100. In some embodiments, one or more components of the MRI system 100 (e.g., the MRI scanner 110, the terminal 130, the processing device 140, or the storage device 150) may communicate information and/or data with one or more other components of the MRI system 100 via the network 120. For example, the processing device 140 may obtain imaging signals from the MRI scanner 110 via the network 120. In some embodiments, the network 120 may be any type of wired or wireless network, or a combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the MRI system 100 may be connected to the network 120 to exchange data and/or information.

The terminal 130 include a mobile device 131, a tablet computer 132, a laptop computer 133, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, smart footgear, a pair of smart glasses, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a Hololens, a Gear VR, etc. In some embodiments, the terminal 130 may remotely operate the MRI scanner 110 and/or the processing device 140. In some embodiments, the terminal 130 may operate the MRI scanner 110 and/or the processing device 140 via a wireless connection. In some embodiments, the terminal 130 may receive information and/or instructions inputted by a user, and send the received information and/or instructions to the MRI scanner 110 or to the processing device 140 via the network 120. In some embodiments, the terminal 130 may receive data and/or information from the processing device 140. In some embodiments, the terminal 130 may be part of the processing device 140. In some embodiments, the terminal 130 may be omitted.

The processing device 140 may process data and/or information obtained from the MRI scanner 110, the terminal 130, and/or the storage device 150. For example, the processing device 140 may generate one or more MR images based on MR signals obtained from the MRI scanner 110. As another example, the processing device 140 may obtain, from the storage device 150 or the terminal 130, one or more MR images and generate a presentation of the one or more MR images. In some embodiments, the processing device 140 may be a single server, or a server group. The server group may be centralized or distributed. In some embodiments, the processing device 140 may be local or remote. For example, the processing device 140 may access information and/or data stored in or acquired by the MRI scanner 110, the terminal 130, and/or the storage device 150 via the network 120. As another example, the processing device 140 may be directly connected to the MRI scanner 110 (as illustrated by the bidirectional arrow in dashed lines connecting the processing device 140 and the MRI scanner 110 in FIG. 1), the terminal 130 (as illustrated by the bidirectional arrow in dashed lines connecting the processing device 140 and the terminal 130 in FIG. 1), and/or the storage device 150 to access stored or acquired information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented on a computing device 300 having one or more components illustrated in FIG. 3 in the present disclosure.

The storage device 150 may store data and/or instructions. In some embodiments, the storage device 150 may store data obtained from the MRI scanner 110, the terminal 130 and/or the processing device 140. For example, the storage device 150 may store one or more medical images. In some embodiments, the storage device 150 may store data and/or instructions that the processing device 140 may execute or use to perform exemplary methods described in the present disclosure. For example, the storage device 150 may store instructions that the processing device 140 may execute to generate a presentation of a plurality of two-dimensional (2D) images. In some embodiments, the storage device 150 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the MRI system 100 (e.g., the MRI scanner 110, the processing device 140, the terminal 130, etc.). One or more components of the MRI system 100 may access the data or instructions stored in the storage device 150 via the network 120. In some embodiments, the storage device 150 may be directly connected to or communicate with one or more components of the MRI system 100 (e.g., the MRI scanner 110, the processing device 140, the terminal 130, etc.). In some embodiments, the storage device 150 may be part of the processing device 140.

In some embodiments, the MRI system 100 may further include one or more power supplies (not shown in FIG. 1) connected to one or more components of the MRI system 100 (e.g., the MRI scanner 110, the processing device 140, the terminal 130, the storage device 150, etc.).

In some embodiments, the MRI scanner 110 may be omitted in the MRI system 100.

Figure 2:
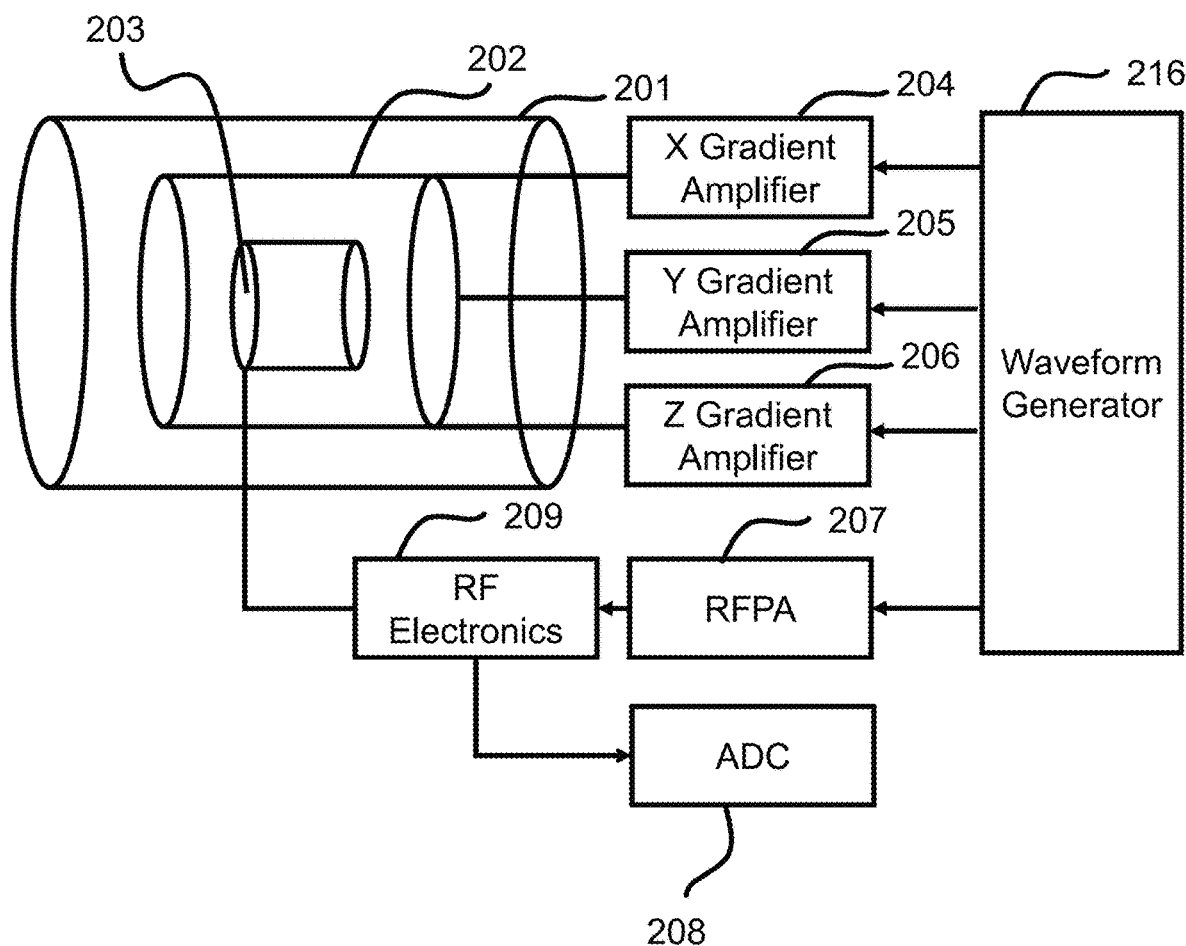
FIG. 2 is a schematic diagram illustrating an exemplary MRI scanner according to some embodiments of the present disclosure.

FIG. 2 is a schematic diagram illustrating an exemplary MRI scanner according to some embodiments of the present disclosure. As illustrated, the main magnet 201 may generate a first magnetic field (or referred to as a main magnetic field) that may be applied to an object (also referred to as a subject) exposed inside the field. The main magnet 201 may include a resistive magnet or a superconductive magnet that both need a power supply (not shown) for operation. Alternatively, the main magnet 201 may include a permanent magnet. The main magnet 201 may include a bore that the object is placed within. The main magnet 201 may also control the homogeneity of the generated main magnetic field. Some shim coils may be in the main magnet 201. The shim coils placed in the gap of the main magnet 201 may compensate for the inhomogeneity of the magnetic field of the main magnet 201. The shim coils may be energized by a shim power supply.

Gradient coils 202 may be located inside the main magnet 201. The gradient coils 202 may generate a second magnetic field (or referred to as a gradient field, including gradient fields Gx, Gy, and Gz). The second magnetic field may be superimposed on the main field generated by the main magnet 201 and distort the main field so that the magnetic orientations of the protons of an object may vary as a function of their positions inside the gradient field, thereby encoding spatial information into MR signals generated by the region of the object being imaged. The gradient coils 202 may include X coils (e.g., configured to generate the gradient field Gx corresponding to the X direction), Y coils (e.g., configured to generate the gradient field Gy corresponding to the Y direction), and/or Z coils (e.g., configured to generate the gradient field Gz corresponding to the Z direction) (not shown in FIG. 2). In some embodiments, the Z coils may be designed based on circular (Maxwell) coils, while the X coils and the Y coils may be designed on the basis of the saddle (Golay) coil configuration. The three sets of coils may generate three different magnetic fields that are used for position encoding. The gradient coils 202 may allow spatial encoding of MR signals for image construction. The gradient coils 202 may be connected with one or more of an X gradient amplifier 204, a Y gradient amplifier 205, or a Z gradient amplifier 206. One or more of the three amplifiers may be connected to a waveform generator 216. The waveform generator 216 may generate gradient waveforms that are applied to the X gradient amplifier 204, the Y gradient amplifier 205, and/or the Z gradient amplifier 206. An amplifier may amplify a waveform. An amplified waveform may be applied to one of the coils in the gradient coils 202 to generate a magnetic field in the X-axis, the Y-axis, or the Z-axis, respectively. The gradient coils 202 may be designed for either a close-bore MRI scanner or an open-bore MRI scanner. In some instances, all three sets of coils of the gradient coils 202 may be energized and three gradient fields may be generated thereby. In some embodiments of the present disclosure, the X coils and Y coils may be energized to generate the gradient fields in the X direction and the Y direction. As used herein, the X-axis, the Y-axis, the Z-axis, the X direction, the Y direction, and the Z direction in the description of FIG. 2 are the same as or similar to those described in FIG. 1.

In some embodiments, radio frequency (RF) coils 203 may be located inside the main magnet 201 and serve as transmitters, receivers, or both. The RF coils 203 may be in connection with RF electronics 209 that may be configured or used as one or more integrated circuits (ICs) functioning as a waveform transmitter and/or a waveform receiver. The RF electronics 209 may be connected to a radiofrequency power amplifier (RFPA) 207 and an analog-to-digital converter (ADC) 208.

When used as transmitters, the RF coils 203 may generate RF signals that provide a third magnetic field that is utilized to generate MR signals related to the region of the object being imaged. The third magnetic field may be perpendicular to the main magnetic field. The waveform generator 216 may generate an RF pulse. The RF pulse may be amplified by the RFPA 207, processed by the RF electronics 209, and applied to the RF coils 203 to generate the RF signals in response to a powerful current generated by the RF electronics 209 based on the amplified RF pulse.

When used as receivers, the RF coils may be responsible for detecting MR signals (e.g., echoes). After excitation, the MR signals generated by the object may be sensed by the RF coils 203. The receive amplifier then may receive the sensed MR signals from the RF coils 203, amplify the sensed MR signals, and provide the amplified MR signals to the ADC 208. The ADC 208 may transform the MR signals from analog signals to digital signals. The digital MR signals then may be sent to the processing device 140 for sampling.

In some embodiments, the gradient coils 202 and the RF coils 203 may be circumferentially positioned with respect to the object. It is understood by those skilled in the art that the main magnet 201, the gradient coils 202, and the RF coils 203 may be situated in a variety of configurations around the object.

In some embodiments, the RFPA 207 may amplify an RF pulse (e.g., the power of the RF pulse, the voltage of the RF pulse) such that an amplified RF pulse is generated to drive the RF coils 203. The RFPA 207 may include a transistor-based RFPA, a vacuum tube-based RFPA, or the like, or any combination thereof. The transistor-based RFPA may include one or more transistors. The vacuum tube-based RFPA may include a triode, a tetrode, a klystron, or the like, or any combination thereof. In some embodiments, the RFPA 207 may include a linear RFPA, or a nonlinear RFPA. In some embodiments, the RFPA 207 may include one or more RFPAs.

In some embodiments, the MRI scanner 110 may further include an object positioning system (not shown). The object positioning system may include an object cradle and a transport device. The object may be placed on the object cradle and be positioned by the transport device within the bore of the main magnet 201.

MRI systems (e.g., the MRI system 100 in the present disclosure) may be commonly used to obtain an interior image from a patient for a particular region of interest that can be used for the purposes of, e.g., diagnosis, treatment, or the like, or a combination thereof. MRI systems include a main magnet (e.g., the main magnet 201) assembly for providing a strong uniform main magnetic field to align the individual magnetic moments of the H atoms within the patient's body. During this process, the H atoms oscillate around their magnetic poles at their characteristic Larmor frequency. If the tissue is subjected to an additional magnetic field, which is tuned to the Larmor frequency, the H atoms absorb additional energy, which rotates the net aligned moment of the H atoms. The additional magnetic field may be provided by an RF excitation signal (e.g., the RF signal generated by the RF coils 203). When the additional magnetic field is removed, the magnetic moments of the H atoms rotate back into alignment with the main magnetic field thereby emitting an MR signal. The MR signal is received and processed to form an MR image. T1 relaxation may be the process by which the net magnetization grows/returns to its initial maximum value parallel to the main magnetic field. T1 may be the time constant for regrowth of longitudinal magnetization (e.g., along the main magnetic field). T2 relaxation may be the process by which the transverse components of magnetization decay or dephase. T2 may be the time constant for decay/dephasing of transverse magnetization.

If the main magnetic field is uniform across the entire body of the patient, then the RF excitation signal may excite all of the H atoms in the sample non-selectively. Accordingly, in order to image a particular portion of the patient's body, magnetic field gradients Gx, Gy, and Gz (e.g., generated by the gradient coils 202) in the x, y, and z directions, having a particular timing, frequency, and phase, may be superimposed on the uniform magnetic field such that the RF excitation signal excites the H atoms in a desired slice of the patient's body, and unique phase and frequency information is encoded in the MR signal depending on the location of the H atoms in the "image slice."

Typically, portions of the patient's body to be imaged are scanned by a sequence of measurement cycles in which the RF excitation signals and the magnetic field gradients Gx, Gy and Gz vary according to an MRI imaging protocol that is being used. A protocol may be designed for one or more tissues to be imaged, diseases, and/or clinical scenarios. A protocol may include a certain number of pulse sequences oriented in different planes and/or with different parameters. The pulse sequences may include spin echo sequences, gradient echo sequences, diffusion sequences, inversion recovery sequences, or the like, or any combination thereof. For instance, the spin echo sequences may include fast spin echo (FSE), turbo spin echo (TSE), rapid acquisition with relaxation enhancement (RARE), half-Fourier acquisition single-shot turbo spin-echo (HASTE), turbo gradient spin echo (TGSE), or the like, or any combination thereof. The protocol may also include information regarding image contrast and/or ratio, an ROI, slice thickness, an imaging type (e.g., T1 weighted imaging, T2 weighted imaging, proton density weighted imaging, etc.), T1, T2, an echo type (spin echo, fast spin echo (FSE), fast recovery FSE, single shot FSE, gradient recalled echo, fast imaging with steady-state procession, and so on), a flip angle value, acquisition time (TA), echo time (TE), repetition time (TR), echo train length (ETL), the number of phases, the number of excitations (NEX), inversion time, bandwidth (e.g., RF receiver bandwidth, RF transmitter bandwidth, etc.), or the like, or any combination thereof.

For each MRI scan, the resulting MR signals may be digitized and processed to reconstruct an image in accordance with the MRI imaging protocol that is used.

FIG. 3 is a schematic diagram illustrating exemplary hardware and/or software components of a computing device on which the processing device 140 may be implemented according to some embodiments of the present disclosure. As illustrated in FIG. 3, the computing device 300 may include a processor 310, a storage 320, an input/output (I/O) 330, and a communication port 340.

The processor 310 may execute computer instructions (program code) and perform functions of the processing device 140 in accordance with techniques described herein. The computer instructions may include routines, programs, objects, components, signals, data structures, procedures, modules, and functions, which perform particular functions described herein. For example, the processor 310 may obtain, from the storage device 150 and/or a terminal 130, one or more medical images. In some embodiments, the processor 310 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 300. However, it should be noted that the computing device 300 in the present disclosure may also include multiple processors, and thus operations of a method that are performed by one processor as described in the present disclosure may also be jointly or separately performed by the multiple processors. For example, if in the present disclosure the processor of the computing device 300 executes both operations A and B, it should be understood that operations A and step B may also be performed by two different processors jointly or separately in the computing device 300 (e.g., a first processor executes operation A and a second processor executes operation B, or the first and second processors jointly execute operations A and B).

Merely by way example, the processor 310 may receive instructions to follow an MRI scan protocol for imaging/scanning the object. For example, the processor 310 may instruct the object positioning system of the MRI scanner 110 to move the object to a proper position within the bore of the main magnet 201. As another example, the processor 310 may also provide certain control signals to control the main magnet 201 to generate a main magnet field with a specific strength.

The processor 310 may receive control signals to set the shape, amplitude, and/or timing of the gradient waveforms and/or the RF waveforms, and send the set parameters to the waveform generator 216 to instruct the waveform generator 216 to generate a particular gradient waveform sequence and pulse sequence that are to be applied to the gradient coils 202 and the RF coils 203 through the amplifiers 204-207, respectively.

The processor 310 may also sample data (e.g., echoes) from the RF coils 203 based on one or more sampling parameters including, e.g., timing information (e.g., the length of data acquisition), the type of k-space data acquisition (e.g., undersampling, oversampling, etc.), sampling trajectory (e.g., Cartesian trajectory, non-Cartesian trajectory such as spiral trajectory, radial trajectory), or the like, or a combination thereof. In some embodiments, the timing information may be input by a user (e.g., an operator) or autonomously determined by the MRI system 100 based on one or more other parameters (e.g., clinical needs) of an imaging process. The timing information may correspond to the type of the gradient and RF waveforms that are sent to the gradient coils 202 and the RF coils 203, respectively, so that the MR signals are correctly sampled. The processor 310 may also generate an MR image by reconstructing the sampled data.

The storage 320 may store data/information obtained from the MRI scanner 110, the terminal 130, the storage device 150, or any other component of the MRI system 100. In some embodiments, the storage 320 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 320 may store one or more programs and/or instructions to perform exemplary methods described in the present disclosure. For example, the storage 320 may store a program for the processing device 140 for generating a presentation of a plurality of two-dimensional (2D) images.

The I/O 330 may input or output signals, data, or information. In some embodiments, the I/O 330 may enable user interaction with the processing device 140. In some embodiments, the I/O 330 may include an input device and an output device. Exemplary input devices may include a keyboard, a mouse, a touch screen, a microphone, a trackball, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

Merely by way of example, a user (e.g., an operator) of the processing device 140 may input data related to an object (e.g., a patient) that is being/to be imaged/scanned through the I/O 330. The data related to the object may include identification information (e.g., the name, age, gender, medical history, contract information, physical examination result, etc.) and/or the test information including the nature of the MRI scan that must be performed. The user may also input parameters needed for the operation of the MRI scanner 110, such as image contrast and/or ratio, a region of interest (ROI), slice thickness, an imaging type (e.g., T1 weighted imaging, T2 weighted imaging, proton density weighted imaging, etc.), T1, T2, an echo type (spin echo, fast spin echo (FSE), fast recovery FSE, single shot FSE, gradient recalled echo, fast imaging with steady-state procession, and so on), a flip angle value, acquisition time (TA), echo time (TE), repetition time (TR), echo train length (ETL), the number of phases, the number of excitations (NEX), inversion time, bandwidth (e.g., RF receiver bandwidth, RF transmitter bandwidth, etc.), a scan type, a type of sampling, or the like, or any combination thereof. The I/O may also display MR images generated based on the sampled data.

The communication port 340 may be connected to a network (e.g., the network 120) to facilitate data communications. The communication port 340 may establish connections between the processing device 140 and the MRI scanner 110, the terminal 130, or the storage device 150. The connection may be a wired connection, a wireless connection, or a combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 340 may be a standardized communication port, such as RS232, RS485, etc. In some embodiments, the communication port 340 may be a specially designed communication port. For example, the communication port 340 may be designed in accordance with the digital imaging and communications in medicine (DICOM) protocol.

Figure 4:
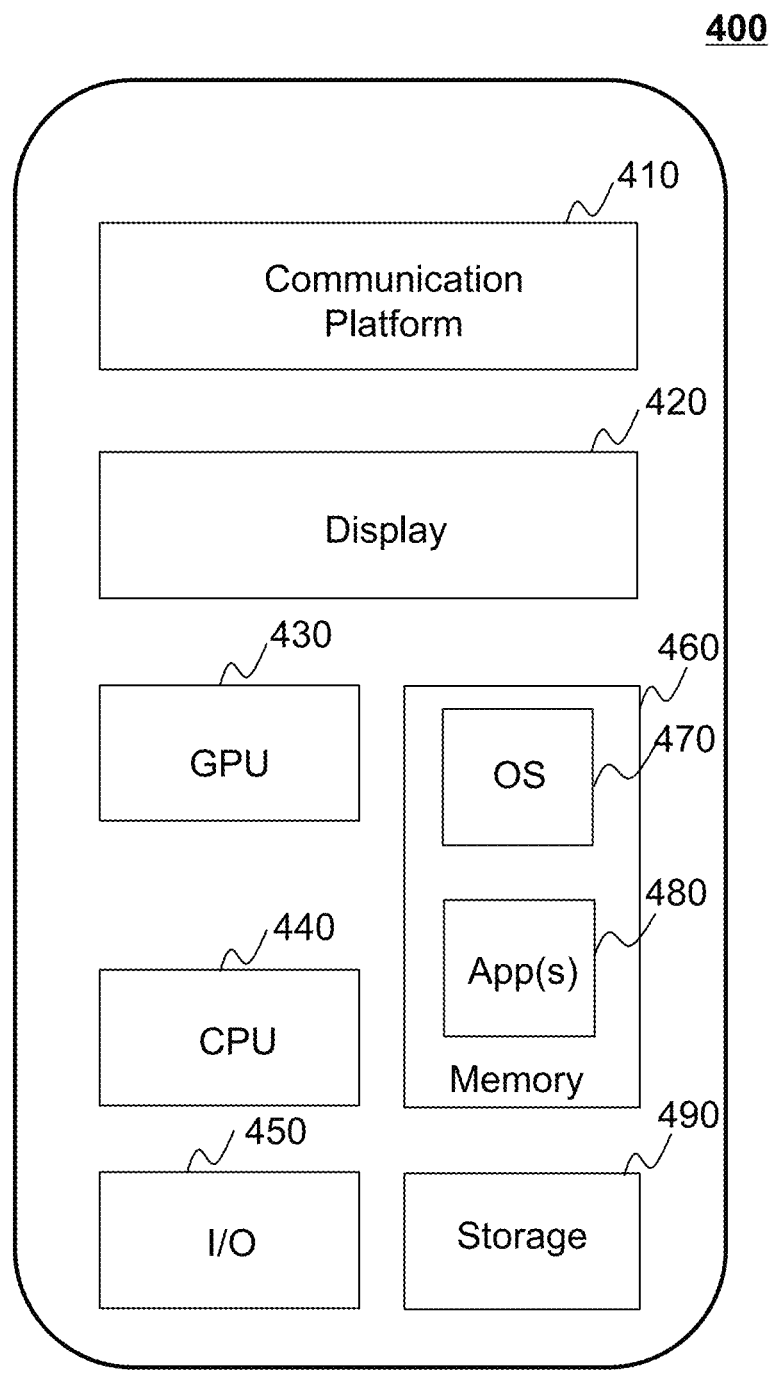
FIG. 4 is a schematic diagram illustrating exemplary hardware and/or software components of a mobile device according to some embodiments of the present disclosure.

FIG. 4 is a schematic diagram illustrating exemplary hardware and/or software components of a mobile device on which the terminal 130 may be implemented according to some embodiments of the present disclosure. As illustrated in FIG. 4, the mobile device 400 may include a communication platform 410, a display 420, a graphic processing unit (GPU) 430, a central processing unit (CPU) 440, an I/O 450, a memory 460, and a storage 490. In some embodiments, any other suitable component, including but not limited to a system bus or a controller (not shown), may also be included in the mobile device 400. In some embodiments, a mobile operating system 470 (e.g., iOS, Android, Windows Phone, etc.) and one or more applications 480 may be loaded into the memory 460 from the storage 490 in order to be executed by the CPU 440. The applications 480 may include a browser or any other suitable mobile apps for receiving and rendering information relating to image processing or other information from the processing device 140. User interactions with the information stream may be achieved via the I/O 450 and provided to the processing device 140 and/or other components of the MRI system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the blood pressure monitoring as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 5:
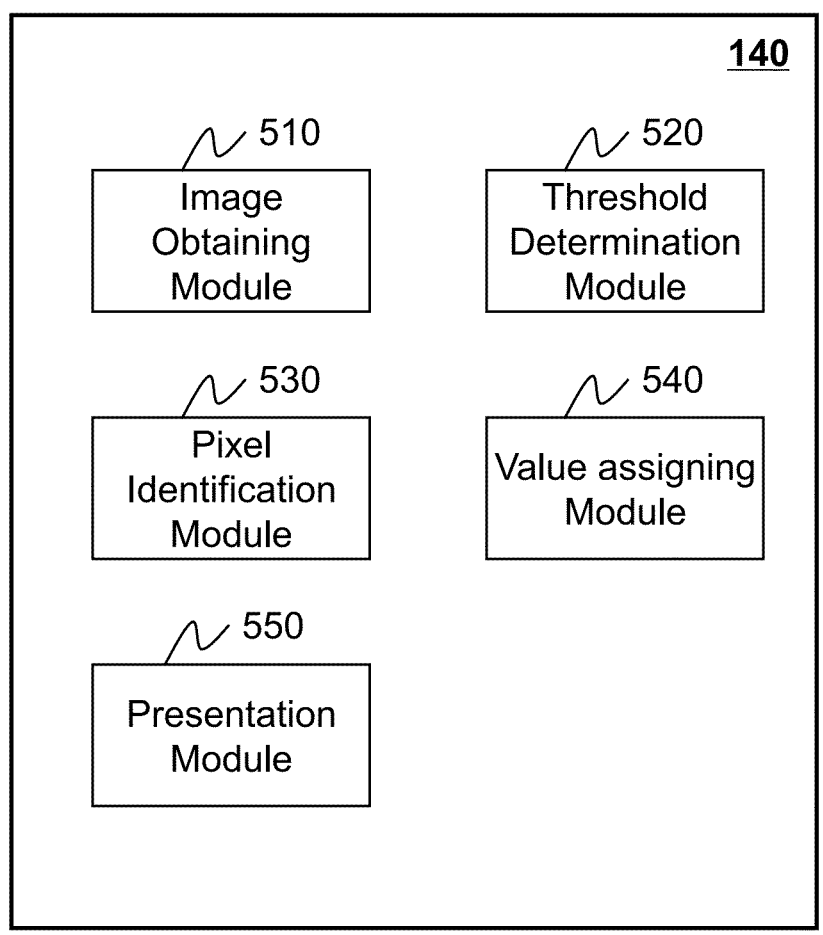
FIG. 5 is a schematic block diagram illustrating an exemplary processing device according to some embodiments of the present disclosure.

FIG. 5 is a schematic block diagram illustrating an exemplary processing device according to some embodiments of the present disclosure. The processing device 140 may include an image obtaining module 510, a threshold determination module 520, a pixel identification module 530, a value assigning module 540, and a presentation module 550.

The image obtaining module 510 may obtain an image representing a region of interest (ROI) of an object. The image may include a plurality of elements. In some embodiments, the image may include one or more two-dimensional (2D) images. In this case, the elements may include a plurality of pixels. In some embodiments, the image may include one or more three-dimensional (3D) images. In this case, the elements may include a plurality of voxels.

In some embodiments, the image may include a single 2D or 3D image. In some embodiments, the image may include a plurality of 2D or 3D image slices. In this case, the ROI of the object may include a volume of interest (VOI). For example, the plurality of 2D or 3D images may present different target areas of the VOI. Optionally, the plurality of 2D OR 3D images may present different slices of the VOI that are perpendicular to the axis between the base and the apex of the object. In some embodiments, the image may be generated based on imaging signals (e.g., the MR signals) corresponding to the ROI. For example, the MR signals may be acquired from the ROI by an MR scanner (e.g., the MRI scanner 110 of the MRI system 100 or an MR scanner in other system). The image may be generated based on the MR signals by one or more processing devices (e.g., the processing device 140 of the MRI system 100 or one or more processing device in other system). In some embodiments, the ROI may include at least a part of the heart of the object. In some embodiments, the ROI may include two or more sub-regions, e.g., left ventricle, right ventricle, left atrium, and right atrium, etc.

The threshold determination module 520 may determine an average signal intensity of signal intensities of the imaging signals associated with elements in the image corresponding to a first region of the ROI (average signal intensity for short). Details regarding determining the average signal intensity may be found elsewhere in the present disclosure (e.g., description in connection with operation 620 of the process 600 in FIG. 6).

The threshold determination module 520 may also determine, for each of the two or more sub-regions of the ROI, a threshold based on the average signal intensity. In some embodiments, the threshold determination module 520 may further determine a standard deviation of the signal intensities of the imaging signals associated with the elements in the image corresponding to the first region of the ROI (standard deviation for short). The threshold determination module 520 may determine, for each of the two or more sub-regions of the ROI, the threshold based on the average signal intensity and the standard deviation. Details may be found elsewhere in the present disclosure (e.g., description in connection with operation 630 of the process 600 in FIG. 6).

The pixel identification module 530 may identify target elements in the image based on the thresholds of the two or more sub-regions. In some embodiments, the signal intensity of the imaging signal of each of the target elements may be equal to or larger than the threshold of the corresponding sub-region. Details may be found elsewhere in the present disclosure (e.g., description in connection with operation 640 of the process 600 in FIG. 6).

The value assigning module 540 may assign a presentation value to each of at least some of the target elements based on the average signal intensity and the signal intensity of the imaging signal of the each target element. In some embodiments, the presentation value of one of at least some of the target elements may be a color value. Details may be found elsewhere in the present disclosure (e.g., description in connection with operation 650 of the process 600 in FIG. 6).

The presentation module 550 may generate a presentation of the image based on the presentation values. Details may be found elsewhere in the present disclosure (e.g., description in connection with operation 660 of the process 600 in FIG. 6).

The modules in the processing device 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the threshold determination module 520 may be divided into a first unit configured to determine the average signal intensity of signal intensities of the imaging signals associated with pixels corresponding to a first region of the VOI, and a second unit configured to determine, for each of the two or more sub-regions of the VOI, a threshold based on the average signal intensity. As another example, value assigning module 540 and the presentation module 550 may be combined as a single module configured to assign a presentation value to each of at least some of the target pixels based on the average signal intensity and the signal intensity of the imaging signal of the each target pixel, and generate a presentation of the plurality of 2D images based on the presentation values.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 140 may further include a storage module (not shown in FIG. 5). The storage module may be configured to store data generated during any process performed by any component of in the processing device 140. As another example, each of the components of the processing device 140 may include a storage device. Additionally or alternatively, the components of the processing device 140 may share a common storage device.

FIG. 6 is a flowchart illustrating an exemplary process for generating a presentation of a plurality of two-dimensional (2D) images according to some embodiments of the present disclosure. In some embodiments, the process 600 may be implemented in the image MRI system 100 illustrated in FIG. 1 or FIG. 2. For example, the process 600 may be stored in a storage medium (e.g., the storage device 150, or the storage 320 of the processing device 140) as a form of instructions, and can be invoked and/or executed by the processing device 140 (e.g., the processor 310 of the processing device 140, or one or more modules in the processing device 140 illustrated in FIG. 5). The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In some embodiments, the processing device 140 may obtain an image representing a region of interest (ROI) of an object. The image may include a plurality of elements. The processing device 140 may assign a presentation value to each of at least some of the plurality of elements and generate a presentation of the image based on the presentation values. In some embodiments, the image may include one or more two-dimensional (2D) images. In this case, the elements may include a plurality of pixels. In some embodiments, the image may include one or more three-dimensional (3D) images. In this case, the elements may include a plurality of voxels.

For brevity, in the description of assigning a presentation value to each of at least some of the plurality of elements and generating a presentation of the image based on the presentation values, an embodiment in which the image includes a plurality of 2D image slice and the ROI of the object include a volume of interest (VOI) may be taken as an example. It should be noted that this embodiment is merely provided for the purposes of illustration, and not intended to limit the scope of the present disclosure. For example, when the image includes one 2D image or the image includes one or more 3D images, the processing device 140 may perform operations similar to the process 600 to assign a presentation value to each of at least some of the plurality of elements and generate a presentation of the image based on the presentation values.

In 610, the processing device 140 (e.g., the image obtaining module 510) may obtain a plurality of two-dimensional (2D) images representing a volume of interest (VOI) of an object. In some embodiments, the plurality of 2D images may include a plurality of pixels and present different target areas of the VOI. Optionally, the plurality of 2D images may present different slices of the VOI that are perpendicular to the axis between the base and the apex of the object. In some embodiments, the plurality of 2D images may be generated based on imaging signals (e.g., the MR signals) corresponding to the VOI. For example, the MR signals may be acquired from the VOI by an MR scanner (e.g., the MRI scanner 110 of the MRI system 100 or an MR scanner in other system). The plurality of 2D images may be generated based on the MR signals by one or more processing devices (e.g., the processing device 140 of the MRI system 100 or one or more processing device in other system). In some embodiments, the VOI may include at least a part of the heart of the object. In some embodiments, the VOI may include two or more sub-regions, e.g., left ventricle, right ventricle, left atrium, right atrium, apex, base, etc.

In 620, the processing device 140 (e.g., the threshold determination module 520) may determine an average signal intensity of signal intensities of the imaging signals associated with pixels corresponding to a first region of the VOI (average signal intensity for short).

In some embodiments, the imaging signal associated with a pixel may refer to the MR signals acquired from a location of the VOI that is represented by the pixel. The signal intensity of the imaging signal may refer to the strength or magnitude of the MR signal. The signal intensity of the imaging signal may reflect intrinsic magnetization properties of the VOI, such as T1, T2, and diffusion metrics. In some embodiments, the grey value of a pixel may reflect the signal intensity of the MR signals corresponding to the pixel. For example, the higher the signal intensity corresponding to a pixel is, the greater the grey value of the pixel may be, and the closer to white the color that the pixel is presented in may be. As another example, the lower the signal intensity corresponding to a pixel is, the smaller the grey value of the pixel may be, and the closer to black the color that the pixel is presented in may be.

In some embodiments, the first region of the VOI may include normal tissue of the VOI. In some embodiments, in at least one of the plurality of 2D images, the processing device 140 may determine a target region representing normal tissue of the VOI. The pixels in the target region may be referred to as the pixels corresponding to the first region of the VOI. In some embodiments, the target region may be determined manually by a user (e.g., a doctor, a technician, an engineer, etc.) or automatically by the processing device 140 based on an image segmentation algorithm and/or machine learning. Exemplary image segmentation algorithms may include a threshold-based segmentation algorithm, an edge-based segmentation algorithm, a region-based segmentation algorithm, a clustering-based algorithm, an image segmentation algorithm based on wavelet transform, an image segmentation algorithm based on mathematical morphology, and an image segmentation algorithm based on artificial neural network, or the like, or any combination thereof.

In 630, the processing device 140 (e.g., the threshold determination module 520) may determine, for each of the two or more sub-regions of the VOI, a threshold based on the average signal intensity.

In some embodiments, the processing device 140 may further determine a standard deviation of the signal intensities of the imaging signals associated with the pixels corresponding to the first region of the VOI (standard deviation for short). For example, the processing device 140 may determine the standard deviation based on Equation (1) below:

$$\sigma = \sqrt{\frac{1}{N}\sum_{i=1}^{N}(X_i - \mu)^2}, \quad (1)$$

wherein $\sigma$ refers to the standard deviation; $\mu$ refers to the average signal intensity; $X_i$ refers to the signal intensity of pixel i corresponding to the first region; and N refers to the total number (or count) of the pixels corresponding to the first region.

In some embodiments, the processing device 140 may determine the threshold based on the average signal intensity and the standard deviation. For example, the processing device 140 may determine the threshold by determining a sum of the average signal intensity and n (n≥0) times of the standard deviation, such as Equation (2) below:

$$T = \mu + n\sigma, \quad (2)$$

wherein T refers to the threshold.

In some embodiments, the thresholds of at least two of the two or more sub-regions may be different, instead of a single threshold for the entire VOI, which may lead to a more accurate result for extracting pixels that represent abnormal tissue whose signal intensities of imaging signals may be higher than the normal tissue, especially when the VOI is a complex structure, such as the heart. For example, the values of n in Equation (2) corresponding to at least two of the two or more sub-regions may be different.

In some embodiments, the threshold of a sub-region of the VOI may be determined, by a user using experience or automatically by the processing device 140, based on, for example, basic information (e.g., age, gender, occupation, etc.) of the object (e.g., a patient), a physiological condition of the VOI, medical history of the object, the goal to scan the object, a treatment plan of the object, or the like, or any combination thereof. In some embodiments, the physiological condition of the VOI may include a condition and/or disease of the VOI, tissue included in the sub-region, or the like, or any combination thereof.

In some embodiments, the processing device 140 may determine the threshold of a sub-region of the VOI using a self-adaptive algorithm. In some embodiments, the processing device 140 may determine the threshold of a sub-region of the VOI using a threshold model. In some embodiments, the threshold model may be a trained machine learning model. For example, the processing device 140 may input at least one of the basic information of the object, the medical history of the object, the condition and/or disease of the VOI, the tissue included in the sub-region, the goal to scan the object, and the treatment plan of the object into the threshold model. The trained machine learning model may output the threshold of the sub-region. Optionally, the processing device 140 may further input the average signal intensity and the standard deviation into the trained machine learning model, and the trained machine learning model may output the value of n in Equation (2) of the sub-region.

In some embodiments, the threshold model may be determined manually by a user (e.g., a doctor, an entity with some authority in a field) or automatically using a processing device based on empirical data. For instance, the threshold model may be a trained machine learning model generated by training a preliminary model using a plurality of sets sample data. For example, each of the plurality of sets sample data may include the basic information of a patient, the medical history of the patient, the condition and/or disease of the heart of the patient, the tissue included in a sub-region of the heart of the patient, the treatment plan of the patient, the goal to scan the object, the threshold of the sub-region that has been determined, or the like, or any combination thereof. In some embodiments, the trained machine learning model may be generated by the MRI system 100 (e.g., the processing device 140) or other system.

In some embodiments, the trained machine learning model may include a regression algorithm, a case learning algorithm, a formal learning algorithm, a decision tree learning algorithm, a Bayesian learning algorithm, a kernel learning algorithm, a clustering algorithm, an association rules learning algorithm, a neural network learning algorithm, a deep learning algorithm, a dimension reduction algorithm, etc. The regression algorithm may include a logistic regression algorithm, a stepwise regression algorithm, a multivariate adaptive regression splines algorithm, a locally estimated scatterplot smoothing algorithm, etc. The case learning algorithm may include a k-nearest neighbor algorithm, a learning vector quantization algorithm, a self-organizing map algorithm, etc. The formal learning algorithm may include a ridge regression algorithm, a least absolute shrinkage and selection operator (LAASSO) algorithm, an elastic net algorithm, etc. The decision tree learning algorithm may include a classification and regression tree algorithm, an iterative dichotomiser 3 (ID3) algorithm, a C4.5 algorithm, a chi-squared automatic interaction detection (CHAID) algorithm, a decision stump algorithm, a random forest algorithm, a mars algorithm, a gradient boosting machine (GBM) algorithm, etc. The Bayesian learning algorithm may include a naive Bayesian algorithm, an averaged one-dependence estimators algorithm, a Bayesian belief network (BBN) algorithm, etc. The kernel learning algorithm may include a support vector machine algorithm, a linear discriminate analysis algorithm, etc. The neural network learning algorithm may include a perceptron neural network algorithm, a back propagation algorithm, a Hopfield network algorithm, a self-organizing map (SOM) algorithm, a learning vector quantization algorithm, etc. The deep learning algorithm may include a restricted Boltzmann machine algorithm, a deep belief networks (DBN) algorithm, a convolutional neural network algorithm, a stacked auto-encoders algorithm, etc. The dimension reduction algorithm may include a principle component analysis algorithm, a partial least square regression algorithm, a Sammon mapping algorithm, a multi-dimensional scaling algorithm, a projection pursuit algorithm, etc.

In 640, the processing device 140 (e.g., the pixel identification module 530) may identify target pixels in the plurality of 2D images based on the thresholds of the two or more sub-regions. In some embodiments, the signal intensity of the imaging signal of each of the target pixels may be equal to or larger than the threshold of the corresponding sub-region.

In some embodiments, the processing device 140 may determine candidate pixels in the plurality of 2D images. The signal intensity of the imaging signal corresponding to each of the candidate pixels may be equal to or larger than the threshold of the corresponding sub-region. In some embodiments, in each of the plurality of 2D images, the processing device 140 may determine an area corresponding to at least one of the two or more sub-region of the VOI. The processing device 140 may determine, in the area, the pixels of which the signal intensities of the imaging signals are equal to or larger than the threshold of the at least one of the two or more sub-region of the VOI as the candidate pixels.

In some embodiments, the processing device 140 may divide the candidate pixels into one or more groups based on the locations of the candidate pixels in the plurality of 2D images. In some embodiments, the processing device 140 may divide the candidate pixels into one or more groups based on the distances between the pixels in the same 2D image of the plurality of 2D images. In some embodiments, the processing device 140 may divide the candidate pixels into one or more groups further based on the distances between the pixels in different 2D images of the plurality of 2D images.

In some embodiments, the processing device 140 may divide the candidate pixels into one or more groups using a cluster algorithm. Exemplary cluster algorithms may include a partitioning algorithm, a hierarchical algorithm, a density-based algorithm, a grid-based algorithm, a model-based model, or the like, or any combination thereof. Exemplary partitioning algorithms may include a K-mean algorithm, a K-medoids algorithm, a clustering algorithm based on randomized search (CLARANS), or the like, or any combination thereof. Exemplary hierarchical algorithms may include an algorithm of balanced iterative reducing and clustering using hierarchies (BIRCH), an algorithm of clustering using representatives (CURE), a chameleon algorithm, or the like, or any combination thereof. Exemplary density-based algorithms may include a density-based spatial clustering of applications with noise (DBSCAN), an algorithm of ordering points to identify the clustering structure (OPTICS), a density clustering (DENCLUE) algorithm, or the like, or any combination thereof. Exemplary grid-based algorithms may include a statistical information grid (STING) algorithm, a wave-cluster algorithm, a clique algorithm, or the like, or any combination thereof. Exemplary model-based algorithms may include an algorithm based on a statistic model, an algorithm based on a neural network model, or the like, or any combination thereof.

The processing device 140 may determine a count of candidate pixels in each of the one or more groups. For each of the one or more groups, the processing device 140 may determine whether the count of candidate pixels in the group exceeds a count threshold. In response to determining that the count of candidate pixels in the group exceeds the count threshold, the processing device 140 may determine the candidate pixels in the group as the target pixels. In this way, by removing one or more isolated pixels from the candidate pixels, the candidate pixels may be filtered to only include one or more sets of pixels each of which includes pixels with contiguity in the 2D space of each of the plurality of 2D images or the three-dimensional (3D) space.

In some embodiments, the target pixels may be determined as corresponding to abnormal tissue of the VOI of the object.

In 650, the processing device 140 (e.g., the value assigning module 540) may assign a presentation value to each of at least some of the target pixels based on the average signal intensity and the signal intensity of the imaging signal of the each target pixel. In some embodiments, the presentation value of one of at least some of the target pixels may be a color value.

In some embodiments, the processing device 140 may determine a difference between the average signal intensity and the signal intensity of the imaging signal corresponding to the each target pixel.

The processing device 140 may determining the presentation value of the each target pixel based on the difference. In some embodiments, target pixels whose differences are within a same range may be assigned a same presentation value. For example, the target pixels whose differences are 3 times the standard deviation (e.g., target pixels whose signal intensities are 3 standard deviations above the average signal intensity) may be assigned a first presentation value (e.g., a color value corresponding to a first color, such as the red color). The target pixels whose differences are twice the standard deviation (e.g., target pixels whose signal intensities are 2 standard deviations above the average signal intensity) may be assigned a second presentation value (e.g., a color value corresponding to a second color, such as the blue color).

In 660, the processing device 140 (e.g., the presentation module 550) may generate a presentation of the plurality of 2D images based on the presentation values. In some embodiments, the presentation may include a three-dimensional (3D) model of at least a portion of the VOI generated based on the plurality of 2D images. In some embodiments, the 3D model may be a 3D mesh surface with adjustable transparence formed by the plurality of 2D images. In some embodiments, the 3D model may include an illustration of presentation values of at least a portion of the at least some target pixels. For example, in the 3D model of the VOI, voxels corresponding to at least a portion of the at least some target pixels may be displayed in a color corresponding to the assigned presentation value.

In some embodiments, the presentation may include at least one of the plurality of 2D images that includes an illustration of presentation values of target pixels within the at least one 2D image. For example, at least a portion of the at least some target pixels in one of the plurality of 2D images may be displayed in a color corresponding to the assigned presentation value.

In some embodiments, the processing device 140 may determine a second region in at least one of the plurality of 2D images. The second region may be a region that target pixels that belong to the at least one of the plurality of 2D images cover. The processing device 140 may determine a first ratio between an area of the second region and an area of the target area of the at least one of the plurality of 2D images. Alternatively or additionally, the processing device 140 may determine a second ratio between a count of pixels in the second region and a count of pixels in the target area of the at least one of the plurality of 2D images.

In some embodiments, the processing device 140 may determine a third region including all the target pixels or the target pixels that are assigned the presentation values (e.g., the at least some of the target pixels). The processing device 140 may determine a third ratio between a volume of the third region and a volume of the VOI. In some embodiments, the processing device 140 may determine a fourth ratio between the volume of the third region and a volume of an American Heart Association (AHA) segmental model. In some embodiments, the AHA segmental model in the present disclosure may be a model defined by the American Heart Association, e.g., discussed in Manuel D. Cerqueira, M D, et al., Standardized Myocardial Segmentation and Nomenclature for Tomographic Imaging of the Heart: A Statement for Healthcare Professionals From the Cardiac Imaging Committee of the Council on Clinical Cardiology of the American Heart Association, American Heart Association 2002, which is hereby incorporated by reference.

In some embodiments, the presentation may further include an illustration (e.g., visualization) of at least one of the second region, the target area, the third region, the VOI, the AHA segmental model, the first ratio, the second ratio, the third ratio, and the fourth ratio.

In some embodiments, the presentation of the plurality of 2D images may provide information including the amount and/or the location of the normal tissue and/or the abnormal tissue in the VOI.

In some embodiments, the presentation of the plurality of 2D images may include a form of visualization (e.g., text, images, videos, etc.), voice, etc.

In some embodiments, the processing device 140 may perform the process 600 after (e.g., immediately or not) the plurality of 2D images are generated, for example, at a defined time reasonably close to the time when the plurality of 2D images are generated for an ordinary person in the art (e.g., 0.1 s, 1 s, 1 minute, 5 minutes, or 10 minutes, etc.). In some embodiments, the processing device 140 may perform the process 600 at a defined time reasonably long from the time when the plurality of 2D images are generated for an ordinary person in the art (e.g., 20 minutes, 1 hour, or 1 day, etc.).

In some embodiments, an image quantitative index may include a quantitative index of each pixel in the image. The quantitative index may represent a characteristic of the pixel. For example, the quantitative index may include the signal intensity corresponding to a pixel, a gray value of a pixel, a concentration of a contrast agent in perfusion imaging corresponding to a pixel, or the like. In some embodiments, the thresholds of the two or more sub-regions may be determined based on the quantitative indexes of the pixels of the plurality of 2D images. The thresholds may be used to divide the pixels of the plurality of 2D images into two categories, such as normal tissue and abnormal tissue. For example, as illustrated in the process 600, the thresholds may be determined based on the signal intensities of the pixels of the plurality of 2D images. The thresholds may be used to divide the pixels of the plurality of 2D images into two categories, e.g., the pixels of which the signal intensities are larger than or equal to the corresponding threshold, and the pixels of which the signal intensities are less than the corresponding threshold. As another example, the thresholds may be determined based on other quantitative indexes of the pixels of the plurality of 2D images, such as the gray values, or the concentrations of a contrast agent in perfusion imaging corresponding to the pixels of the plurality of 2D images, etc.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the signal intensity illustrated in the process 600 may be replaced by one or more other quantitative indexes of the pixels, such as the gray values, or concentrations of a contrast agent in perfusion imaging corresponding to the pixels of the plurality of 2D images, etc.

Figure 7:
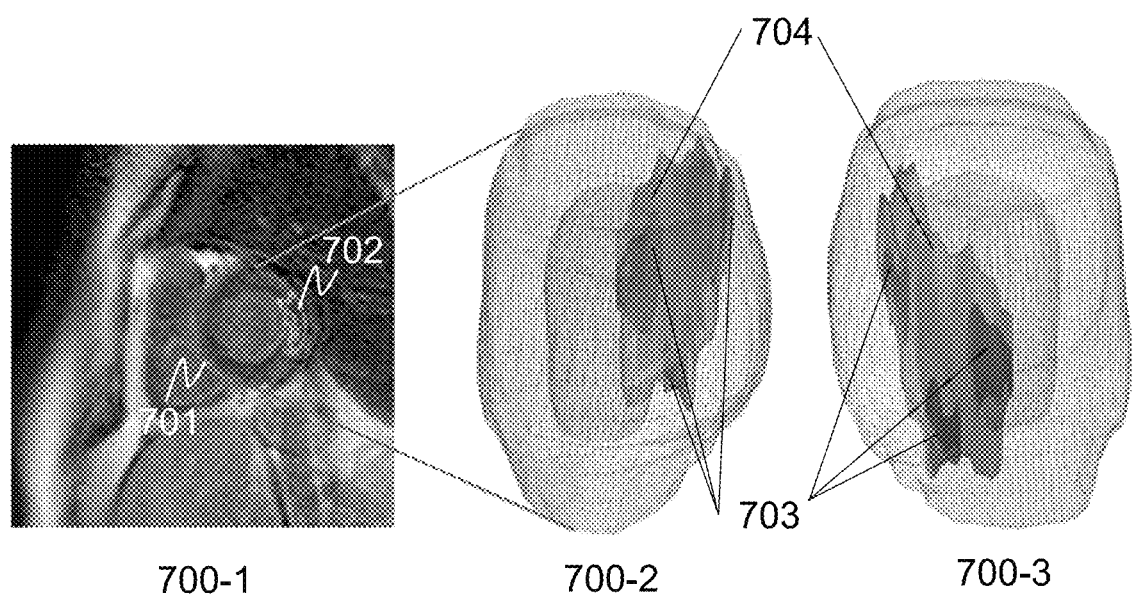
FIG. 7 is a schematic diagram illustrating an exemplary presentation of a plurality of two-dimensional (2D) images according to some embodiments of the present disclosure.

FIG. 7 is a schematic diagram illustrating an exemplary presentation of a plurality of two-dimensional (2D) images according to some embodiments of the present disclosure.

In the embodiment of FIG. 7, a plurality of 2D images representing a VOI of the heart of a patient may be obtained. The VOI may include scar tissue in the heart myocardium. The presentation of the plurality of 2D images may be generated based on the process 600 in FIG. 6. The presentation may include displaying one of the plurality of 2D images (e.g., image 700-1 shown in FIG. 7), with pixels 702 displayed in the color based on the presentation values determined based on the process 600. The presentation may further include the generation and/or display of a constructed 3D volume of the left ventricle myocardium based on the plurality of 2D images. Region 701 in image 700-1 may represent a section of the left ventricle myocardium. Images 700-2 and 700-3 are two views of the constructed 3D volume rotated in space. The constructed 3D volume of the left ventricle myocardium may be displayed as a gray wire mesh. Voxels 703 in the constructed 3D volume corresponding to target pixels whose signal intensities are 3 times the standard deviation above the average signal intensity may be displayed in a darker color. Voxels 704 in the constructed 3D volume corresponding to target pixels whose signal intensities are 2 standard deviations above the average signal intensity may be displayed in a lighter color. In this example, this allows a user to see that the more intense scar region (covered by voxels 703 that are displayed in the darker color) is localized towards the epicardium.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system comprising:
at least one storage device including a set of instructions; and
at least one processor in communication with the at least one storage device, wherein when executing the set of instructions, the at least one processor is directed to cause the system to perform operations including:
obtaining an image representing a region of interest (ROI) of an object, the ROI including two or more sub-regions, the image being generated based on imaging signals corresponding to the ROI;
determining an average value of quantitative indexes associated with elements in the image corresponding to a first region of the ROI;
determining a standard deviation based on differences each of which is between the average value and the quantitative index of one of the elements in the first region;
for each of the two or more sub-regions of the ROI, determining a sum of the average value and n times of the standard deviation as a threshold, wherein n>0, the thresholds of at least two of the two or more sub-regions being different;
identifying target elements in the image based on the thresholds of the two or more sub-regions, the quantitative index of each of the target elements being equal to or larger than the threshold of the corresponding sub-region;
assigning a presentation value to each of at least some of the target elements based on the average value and the quantitative index of the each target element; and
generating a presentation of the image based on the presentation values.

2. The system of claim 1, wherein the ROI includes a volume of interest (VOI).

3. The system of claim 1, wherein the image includes a plurality of two-dimensional (2D) image slices.

4. The system of claim 3, wherein each of the plurality of 2D image slices includes a target area corresponding to the ROI; and
wherein the at least one processor is further directed to cause the system to perform at least one of the following operations including:
determining a second region in at least one of the plurality of 2D image slices, the second region including at least a portion of the target elements;

determining a first ratio between an area of the second region and an area of the target area of the at least one of the plurality of 2D image slices;

determining a third region including all the target elements;

determining a second ratio between a volume of the third region and a volume of the ROI; and determining a third ratio between the volume of the third region and a volume of an American Heart Association (AHA) segmental model.

5. The system of claim 4, wherein the presentation includes an illustration of at least one of the second region, the target area, the third region, the ROI, the first ratio, the second ratio, the third ratio, and the AHA segmental model.

6. The system of claim 3, wherein the presentation includes at least one of the plurality of 2D image slices that includes an illustration of presentation values of the target elements within the at least one 2D image slice.

7. The system of claim 1, wherein the presentation value of one of at least some of the target elements is a color value.

8. The system of claim 1, wherein the first region of the ROI includes normal tissue within the ROI.

9. The system of claim 1, wherein the threshold for each of the two or more sub-regions of the ROI relates to a physiological condition of the ROI.

10. The system of claim 1, wherein the identifying the target elements in the image includes:
determining candidate elements in the image, the quantitative index corresponding to each of the candidate elements being equal to or larger than the threshold of the corresponding sub-region;
dividing the candidate elements into one or more groups based on the locations of the candidate elements in the image;
determining a count of candidate elements in each of the one or more groups;
for each of the one or more groups,
determining whether the count of candidate elements in the group exceeds a count threshold; and
in response to determining that the count of candidate elements in the group exceeds the count threshold, determining the candidate elements in the group as the target elements.

11. The system of claim 1, wherein the assigning the presentation value to each of at least some of the target elements based on the average value and the quantitative index of the each target element includes:
determining a difference between the average value and the quantitative index corresponding to the each target element; and
determining the presentation value of the each target element based on the difference,
wherein target elements whose differences are within a same range are assigned a same presentation value.

12. The system of claim 1, wherein the presentation includes a three-dimensional (3D) model corresponding to at least a portion of the ROI.

13. The system of claim 12, wherein the 3D model includes an illustration of presentation values of at least a portion of the at least some target elements.

14. The system of claim 1, wherein the image includes one or more computed tomography (CT) images or magnetic resonance (MR) images.

15. The system of claim 1, wherein the ROI includes at least a part of a heart of the object.

16. The system of claim 1, wherein the quantitative index associated with the element includes signal intensity of the imaging signal associated with the element.

17. A method implemented on a machine having one or more processors and one or more storage devices, comprising:
obtaining an image representing a region of interest (ROI) of an object, the ROI including two or more sub-regions, the image being generated based on imaging signals corresponding to the ROI;
determining an average value of quantitative indexes associated with elements in the image corresponding to a first region of the ROI;
determining a standard deviation based on differences each of which is between the average value and the quantitative index of one of the elements in the first region;
for each of the two or more sub-regions of the ROI, determining a sum of the average value and n times of the standard deviation as a threshold, wherein n>0, the thresholds of at least two of the two or more sub-regions being different;
identifying target elements in the image based on the thresholds of the two or more sub-regions, the quantitative index of each of the target elements being equal to or larger than the threshold of the corresponding sub-region;
assigning a presentation value to each of at least some of the target elements based on the average value and the quantitative index of the each target element; and
generating a presentation of the image based on the presentation values.

18. The method of claim 17, wherein the quantitative index associated with the element includes signal intensity of the imaging signal associated with the element.

19. The method of claim 17, wherein
the image includes a plurality of two-dimensional (2D) image slices;
each of the plurality of 2D image slices includes a target area corresponding to the ROI; and
the at least one processor is further directed to cause the system to perform at least one of the following operations including:
determining a second region in at least one of the plurality of 2D image slices, the second region including at least a portion of the target elements;
determining a first ratio between an area of the second region and an area of the target area of the at least one of the plurality of 2D image slices;
determining a third region including all the target elements;
determining a second ratio between a volume of the third region and a volume of the ROI; and
determining a third ratio between the volume of the third region and a volume of an American Heart Association (AHA) segmental model.

20. A non-transitory computer readable medium, comprising at least one set of instructions, wherein when executed by one or more processors of a computing device, the at least one set of instructions causes the computing device to perform a method, the method comprising:
obtaining an image representing a region of interest (ROI) of an object, the ROI including two or more sub-regions, the image being generated based on imaging signals corresponding to the ROI;

determining an average value of quantitative indexes associated with elements in the image corresponding to a first region of the ROI;

determining a standard deviation based on differences each of which is between the average value and the quantitative index of one of the elements in the first region;

for each of the two or more sub-regions of the ROI, determining a sum of the average value and n times of the standard deviation as a threshold, wherein n>0, the thresholds of at least two of the two or more sub-regions being different;

identifying target elements in the image based on the thresholds of the two or more sub-regions, the quantitative index of each of the target elements being equal to or larger than the threshold of the corresponding sub-region;

assigning a presentation value to each of at least some of the target elements based on the average value and the quantitative index of the each target element; and generating a presentation of the image based on the presentation values.

* * * * *